US009550413B2

(12) United States Patent
Take

(10) Patent No.: US 9,550,413 B2
(45) Date of Patent: Jan. 24, 2017

(54) HYBRID WORK MACHINE

(71) Applicant: Komatsu Ltd., Tokyo (JP)

(72) Inventor: Hiroaki Take, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/650,417

(22) PCT Filed: Jul. 24, 2013

(86) PCT No.: PCT/JP2013/070112
§ 371 (c)(1),
(2) Date: Jun. 8, 2015

(87) PCT Pub. No.: WO2015/011809
PCT Pub. Date: Jan. 29, 2015

(65) Prior Publication Data
US 2015/0315766 A1 Nov. 5, 2015

(51) Int. Cl.
*B60W 20/00* (2016.01)
*B60K 6/485* (2007.10)
(Continued)

(52) U.S. Cl.
CPC .............. *B60K 6/485* (2013.01); *B60W 10/06* (2013.01); *B60W 10/08* (2013.01); *B60W 20/00* (2013.01);
(Continued)

(58) Field of Classification Search
CPC . E02F 9/2075; E02F 9/2246; B60L 2240/441; Y02T 10/6226; B60W 2710/081; B60W 2510/081
See application file for complete search history.

(56) References Cited

U.S. PATENT DOCUMENTS 7,745,947 B2    6/2010  Komiyama et al.
2010/0186713 A1*  7/2010  Kawaguchi ........... E02F 9/2075
                                                  123/350
(Continued)

FOREIGN PATENT DOCUMENTS

DE    19532128 A1   3/1997
JP    2004-080967 A  3/2004
(Continued)

OTHER PUBLICATIONS

International Search Report mailed Sep. 24, 2013, issued for PCT/JP2013/070112.
(Continued)

*Primary Examiner* — Khoi Tran
*Assistant Examiner* — Ryan Rink
(74) *Attorney, Agent, or Firm* — Locke Lord LLP

(57) ABSTRACT

A hybrid work machine includes: an engine; a generator motor; a storage battery; a motor; a transformer; a target engine speed calculation unit configured to calculate a target engine speed based on at least an engine load and an output state of the generator motor; a generation control unit configured to output a generator requesting minimum engine speed; an engine controlling target engine speed calculation unit configured to calculate and output an engine controlling target engine speed based on the target engine speed and the generator requesting minimum engine speed; an engine control unit configured to control an engine speed based on the engine controlling target engine speed; and an assist control unit configured to set the target engine speed to the generator controlling target engine speed and control engine assist based on the generator controlling target engine speed and the generator motor speed.

8 Claims, 8 Drawing Sheets

(51) Int. Cl.
  B60W 10/06    (2006.01)
  B60W 10/08    (2006.01)
  E02F 9/20     (2006.01)
  E02F 9/22     (2006.01)
  F02D 29/04    (2006.01)
  G05B 7/00     (2006.01)
  H01F 38/00    (2006.01)
  F02D 41/02    (2006.01)
  F02D 11/10    (2006.01)

(52) U.S. Cl.
  CPC ............ B60W 20/15 (2016.01); E02F 9/20 (2013.01); E02F 9/2075 (2013.01); E02F 9/2246 (2013.01); F02D 29/04 (2013.01); F02D 41/021 (2013.01); F02D 41/0205 (2013.01); G05B 7/00 (2013.01); H01F 38/00 (2013.01); *B60W 2300/17* (2013.01); *B60W 2510/244* (2013.01); *B60W 2510/246* (2013.01); *F02D 11/105* (2013.01); *Y10S 903/93* (2013.01)

(56) References Cited

U.S. PATENT DOCUMENTS

| | | | |
|---|---|---|---|
| 2012/0109472 A1* | 5/2012 | Yanagisawa | B60K 6/46 701/50 |
| 2012/0203415 A1 | 8/2012 | Akutsu et al. | |
| 2013/0103203 A1 | 4/2013 | Masuda et al. | |
| 2013/0325268 A1* | 12/2013 | Ishihara | E02F 9/2246 701/50 |
| 2014/0188373 A1 | 7/2014 | Kawaguchi et al. | |
| 2014/0277970 A1* | 9/2014 | Sakamoto | E02F 9/123 701/50 |
| 2015/0008054 A1* | 1/2015 | Hoshino | E02F 9/2075 180/65.26 |
| 2015/0354170 A1* | 12/2015 | Ishihara | E02F 9/2075 701/22 |
| 2016/0076227 A1* | 3/2016 | Hoshino | B60L 11/14 701/22 |
| 2016/0090077 A1* | 3/2016 | Choi | B60W 10/06 701/22 |

FOREIGN PATENT DOCUMENTS

| | | |
|---|---|---|
| JP | 2006-125218 A | 5/2006 |
| JP | 2007-218111 A | 8/2007 |
| JP | 2008-121659 A | 5/2008 |
| JP | 2012-025249 A | 2/2012 |
| JP | 2012-025294 A | 2/2012 |
| JP | 2012-241587 A | 12/2012 |

OTHER PUBLICATIONS

Office Action dated May 11, 2016, issued for the corresponding German Patent Application No. 112013005377.2 and English translation thereof.

* cited by examiner

HYBRID WORK MACHINE

FIELD

The present invention relates to a hybrid work machine capable of executing engine assist control while suppressing deterioration of heat balance of a transformer and a capacitor.

BACKGROUND

There is a hybrid work machine configured to operate a work unit or the like by driving a generator motor with an engine and driving a motor with power generated by the generator motor. For example, Patent Literature 1 discloses a technology in which a hydraulic pump and a generator motor are driven by an engine, and a battery is charged by generation action of the generator motor, and further an engine is assisted by driving the generator motor with battery power. Further, Patent Literature 1 discloses the technology in which output of the generator is restricted until an engine rotation speed reaches a setting speed at the time of accelerating the engine so as to assist acceleration by reducing an engine load.

Furthermore, Patent Literature 2 discloses a technology in which whether to cause a generator motor to execute engine torque assist action or not to execute engine torque assist action is determined. In the case of determining to cause the generator motor to execute the engine torque assist action, the generator motor is caused to execute the engine torque assist action, and in the case of determining not to cause the generator motor to execute the engine torque assist action, the generator motor is caused to execute generation action in accordance with a requested generation amount.

CITATION LIST

Patent Literature

Patent Literature 1: Japanese Laid-open Patent Publication No. 2008-121659
Patent Literature 2: Japanese Laid-open Patent Publication No. 2007-218111

SUMMARY

Technical Problem

Meanwhile, a hybrid work machine includes a hybrid controller configured to execute engine assist control and generation control, a pump controller configured to control a flow rate of a hydraulic pump, and an engine controller configured to control an engine speed of an engine. The hybrid controller calculates a generator requesting minimum engine speed which is a minimum engine speed to secure power generation output. The pump controller selects a higher engine speed out of a target engine speed requested based on an operating amount of an operating lever, load output, etc. and the generator requesting minimum engine speed output from the hybrid controller, and outputs the selected higher engine speed as a final target engine speed to the engine controller and the hybrid controller. Further, the engine controller controls the final target engine speed. During this control, in the case where the final target engine speed having a deviation exceeding an actual engine speed by a predetermined speed or more is caused, the hybrid controller executes engine assist control to accelerate the engine speed by the generator motor.

Here, for example, in the case where capacitor voltage of a capacitor is decreased, the hybrid controller calculates a generator controlling target engine speed high in order to secure necessary generation power, and executes engine assist as a result thereof. However, the capacitor voltage is further decreased by this engine assist.

This further decrease of the capacitor voltage increases input/output current with respect to the capacitor and a transformer, namely, a voltage converter for the capacitor. Also, when the voltage value deviates from an optimal voltage value preliminarily set for the transformer to reduce a loss, the larger the voltage value deviation is, the more increased transform loss is. Therefore, there may be a problem where heat balance of the transformer and the capacitor is deteriorated.

The present invention is made in view of the above-described situation, and directed to providing a hybrid work machine capable of executing engine assist control while suppressing deterioration of heat balance of the transformer and the capacitor.

Solution to Problem

To solve the above-described problem and achieve the object, a hybrid work machine according to the present invention includes: an engine; a generator motor connected to a drive shaft of the engine; a storage battery configured to store power generated by the generator motor and supply power to the generator motor; a motor configured to be driven by at least one of power generated by the generator motor and power stored in the storage battery; a transformer disposed between the storage battery and both the generator motor and the motor; a target engine speed calculation unit configured to calculate a target engine speed based on at least an engine load and an output state of the generator motor; a generation control unit configured to output a generator requesting minimum engine speed, which is a minimum engine speed to secure generation power of the storage battery, in accordance with a storage state of the storage battery and a generator motor speed; an engine controlling target engine speed calculation unit configured to calculate and output an engine controlling target engine speed based on the target engine speed and the generator requesting minimum engine speed; an engine control unit configured to control an engine speed based on the engine controlling target engine speed; and an assist control unit configured to set the target engine speed to the generator controlling target engine speed and control engine assist based on the generator controlling target engine speed and the generator motor speed.

Moreover, a hybrid work machine according to the present invention includes: an engine; a generator motor connected to a drive shaft of the engine; a storage battery configured to store power generated by the generator motor and supply power to the generator motor; a motor configured to be driven by at least one of power generated by the generator motor and power stored in the storage battery; a transformer disposed between the storage battery and both the generator motor and the motor; a target engine speed calculation unit configured to calculate a target engine speed based on at least an engine load and an output state of the generator motor; a generation control unit configured to output a generator requesting minimum engine speed, which is a minimum engine speed to secure generation power of the storage battery, in accordance with a storage state of the storage battery and a generator motor speed; an engine controlling target engine speed calculation unit configured to calculate and output an engine controlling target engine speed based on the target engine speed and the generator requesting minimum engine speed; an engine control unit configured to control an engine speed based on the engine controlling target engine speed; an output processing unit configured to output the target engine speed as a generator controlling target engine speed at a time the generator requesting minimum engine speed exceeds the target engine speed; and an assist control unit configured to control engine assist based on a generator controlling target engine speed output from the output processing unit, and a generator motor speed.

Moreover, in the above-described hybrid work machine according to the present invention, the output processing unit outputs the target engine speed as a generator controlling target engine speed at a time of satisfying any one of cases where: the generator requesting minimum engine speed exceeds the target engine speed; voltage of the storage battery exceeds predetermined voltage; a transformer temperature exceeds a predetermined transformer temperature; and a storage battery temperature exceeds a predetermined storage battery temperature.

Moreover, in the above-described hybrid work machine according to the present invention, the target engine speed control unit calculates, as a target engine speed, an engine speed at an intersection point between a matching route and a target engine output setting line that specifies target engine output in a torque chart relative to an engine speed.

Moreover, in the above-described hybrid work machine according to the present invention, a voltage conversion ratio of the transformer is same as a ratio of number of turns between number of coil turns on a side to be an input side and number of coil turns on a side to be an output side.

According to the present invention, the target engine speed calculation unit calculates the target engine speed based on at least the engine load and the output state of a generator motor, and the assist control unit is configured to control engine assist based on the generator controlling target engine speed and the generator motor speed while setting the target engine speed as the generator controlling target engine speed. Therefore, useless engine assist caused by increase of the generator requesting minimum engine speed is prevented and deterioration of heat balance of the transformer and the capacitor can be suppressed.

DESCRIPTION OF EMBODIMENTS

In the following, embodiments to implement the present invention will be described with reference to the attached drawings.

Figure 1:
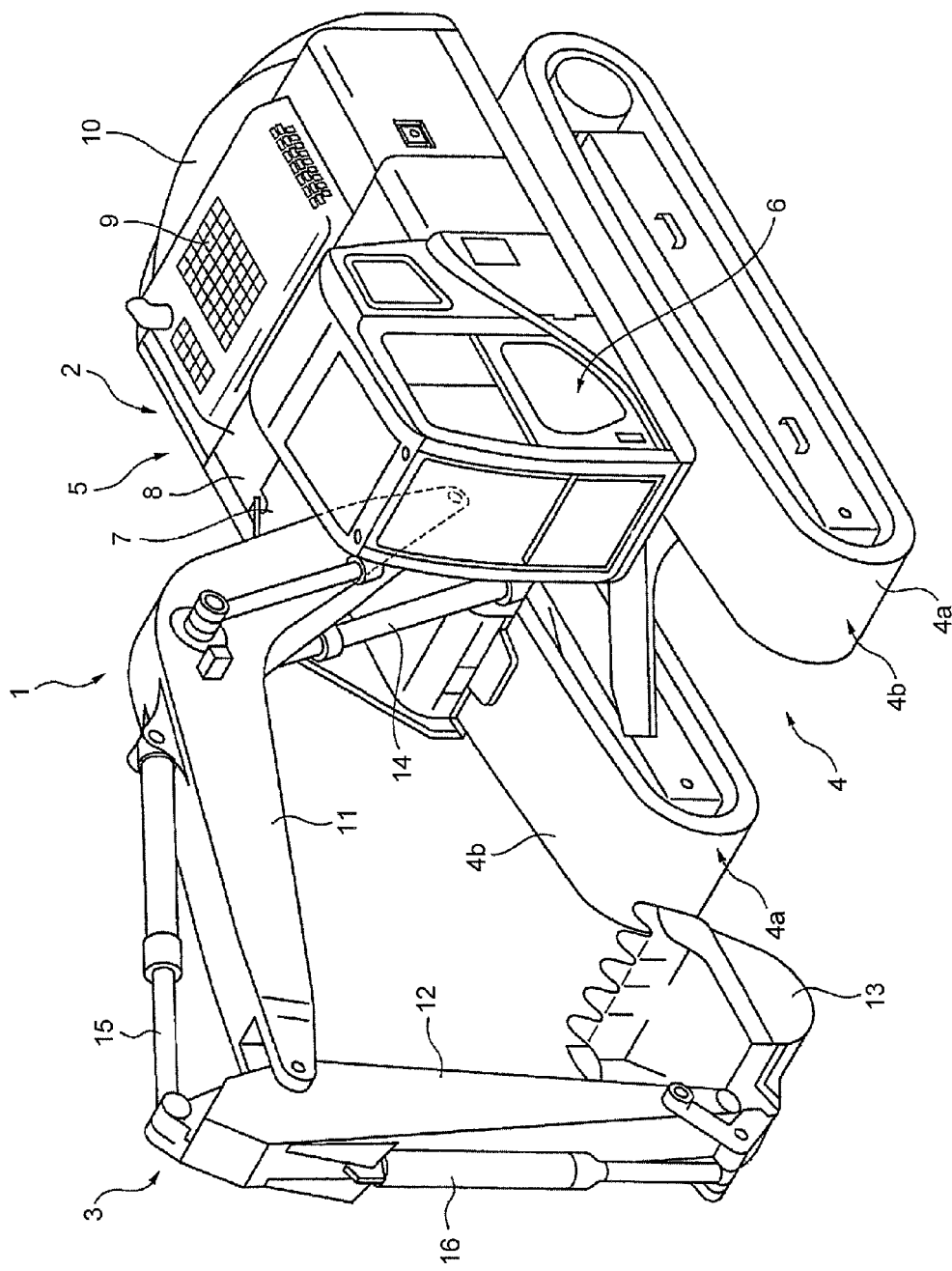
FIG. 1 is a perspective view illustrating a hybrid excavator as an example of a hybrid work machine.
Figure 2:
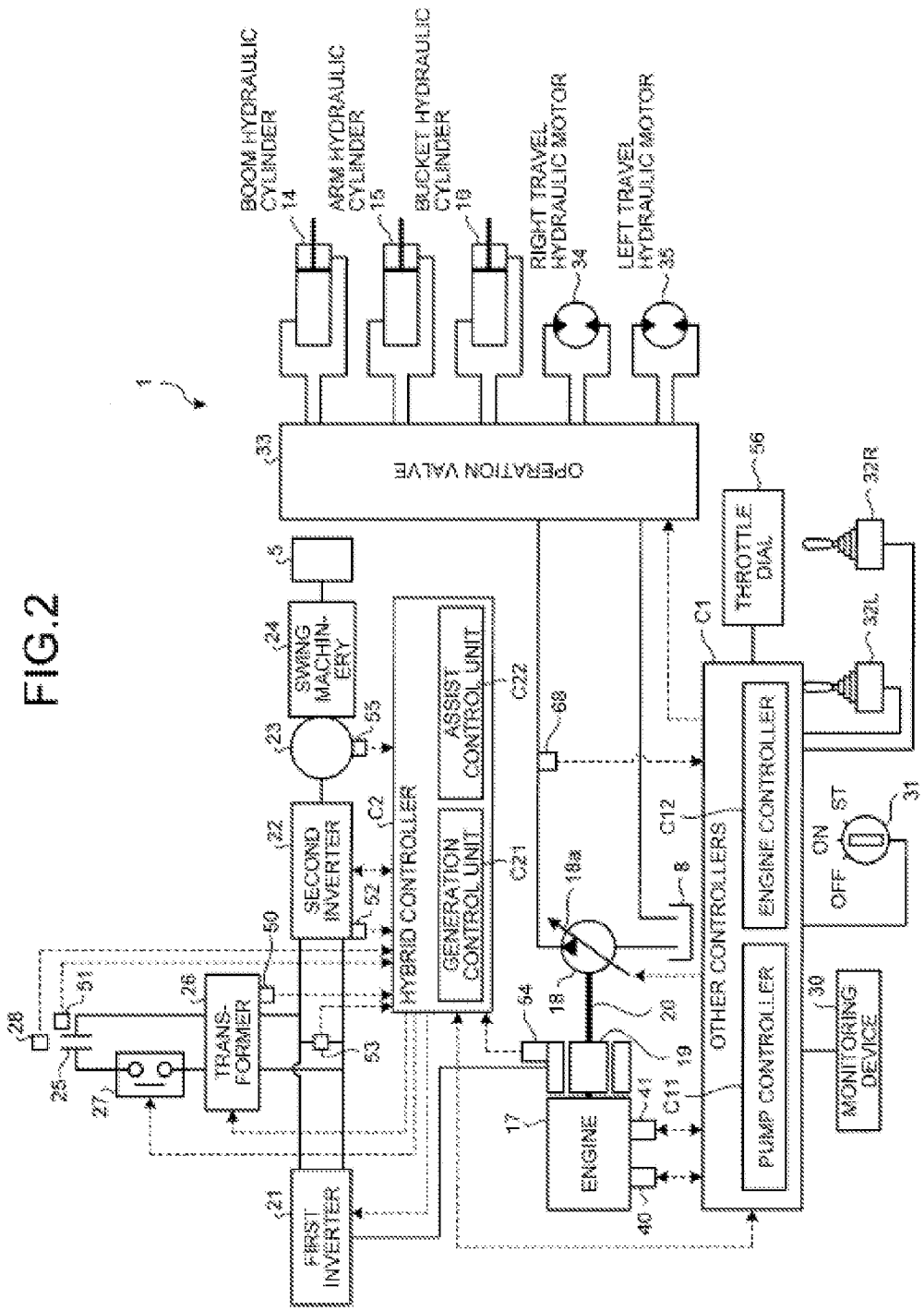
FIG. 2 is a block diagram illustrating a device configuration of the hybrid excavator illustrated in FIG. 1.

FIG. 1 is a perspective view illustrating a hybrid excavator 1 as an example of a hybrid work machine. FIG. 2 is a block diagram illustrating a device configuration of the hybrid excavator 1 illustrated in FIG. 1. Note that a concept of a pure work machine, which is not hybrid, includes construction machines such as an excavator, a bulldozer, a dump truck, and a wheel loader, and it is defined here that a hybrid work machine has a configuration unique to hybrid, in which an electric motor configured to be driven by drive force from an engine as well as power exchanged with other power supply devices is included in the above-described construction machines.

(Hybrid Excavator)

The hybrid excavator 1 includes a vehicle body 2, and a work unit 3. The vehicle body 2 includes a lower traveling body 4, and an upper swing body 5. The lower traveling body 4 includes a pair of travel devices 4a. The respective travel devices 4a include crawlers 4b. The respective travel devices 4a make the hybrid excavator 1 travel by driving the crawlers 4b by rotationally driving a right travel hydraulic motor 34 and a left travel hydraulic motor 35 illustrated in FIG. 2.

The upper swing body 5 is provided at an upper portion of the lower traveling body 4 in a swingable manner. The upper swing body 5 includes a swing motor 23 in order to swing itself. The swing motor 23 is connected to a drive shaft of a swing machinery 24 (reducer). Rotative force of the swing motor 23 is transmitted via the swing machinery 24, the transmitted rotative force is transmitted to the upper swing body 5 via a swing pinion, a swing circle, etc. not illustrated, and swings the upper swing body 5. The swing motor 23 is an electric motor to be driven by power supplied from a generator motor 19 or a capacitor 25, but may be a hydraulic motor to be driven by hydraulic pressure. Further, according to the present embodiment, the swing motor 23 is driven to swing the upper swing body 5 as an example of the motor, but the motor may be a hydraulic pump to drive the work unit 3 or a component to drive the lower traveling body 4.

An operating room 6 is provided at the upper swing body 5. Further, the upper swing body 5 includes a fuel tank 7, a hydraulic oil tank 8, an engine room 9, and a counterweight 10. The fuel tank 7 stores fuel to drive an engine 17 as an internal-combustion engine. The hydraulic oil tank 8 stores hydraulic oil to be discharged from a hydraulic pump 18 to hydraulic devices including: hydraulic cylinders such as a boom hydraulic cylinder 14, an arm hydraulic cylinder 15, and a bucket hydraulic cylinder 16; and the hydraulic motors (hydraulic actuators) such as the right travel hydraulic motor 34 and left travel hydraulic motor 35. In the engine room 9, various kinds of devices such as the engine 17, the hydraulic pump 18, a generator motor 19, and a capacitor 25 as a storage battery are housed. The counterweight 10 is disposed behind the engine room 9.

The work unit 3 is mounted at a center position of a front portion of the upper swing body 5, and includes a boom 11, an arm 12, a bucket 13, the boom hydraulic cylinder 14, the arm hydraulic cylinder 15, and the bucket hydraulic cylinder 16. A base end portion of the boom 11 is connected to the upper swing body 5 in a swingable manner. Further, a tip portion of the boom 11 on an opposite side of the base end portion is connected to a base end portion of the arm 12. The bucket 13 is rotatably connected to a tip portion of the arm 12 on an opposite side of the base end portion. Further, the bucket 13 is connected to the bucket hydraulic cylinder 16 via a link. The boom hydraulic cylinder 14, arm hydraulic cylinder 15, and bucket hydraulic cylinder 16 are the hydraulic cylinders (hydraulic actuators) configured to extend and contract by hydraulic oil discharged from the hydraulic pump 18. The boom hydraulic cylinder 14 swings the boom 11. The arm hydraulic cylinder 15 swings the arm 12. The bucket hydraulic cylinder 16 swings the bucket 13.

In FIG. 2, the hybrid excavator 1 includes the engine 17, the hydraulic pump 18, and the generator motor 19 as driving sources. A diesel engine is used as the engine 17, and a variable displacement hydraulic pump is used as the hydraulic pump 18. The hydraulic pump 18 is, for example, a swash plate hydraulic pump in which pump capacity is changed by changing an inclination angle of a swash plate 18a, but not limited thereto. In the engine 17, a rotation sensor 41 configured to detect a rotation speed of the engine 17 (engine speed per unit time) is provided. A signal indicating the rotation speed of the engine 17 (engine speed) detected by the rotation sensor 41 is acquired by an engine controller C12, and received in a hybrid controller C2 from the engine controller C12 via an in-vehicle network. The rotation sensor 41 detects the engine speed of the engine 17.

A drive shaft 20 of the engine 17 is connected directly or indirectly to the hydraulic pump 18 and generator motor 19, and the hydraulic pump 18 and generator motor 19 are driven by drive of the engine 17. As a hydraulic drive system, an operation valve 33, the boom hydraulic cylinder 14, the arm hydraulic cylinder 15, the bucket hydraulic cylinder 16, the right travel hydraulic motor 34, the left travel hydraulic motor 35, etc. are included. The hydraulic pump 18 functions as a hydraulic oil supply source to the hydraulic drive system, and drives these hydraulic devices. Additionally, the operation valve 33 is a flow direction control valve configured to move a spool not illustrated in accordance with operating directions of the operating levers 32L, 32R and regulate the flow direction of the hydraulic oil to each of the hydraulic actuators. Further, the operation valve 33 is configured to supply the hydraulic oil to the hydraulic actuator such as the boom hydraulic cylinder 14, the arm hydraulic cylinder 15, the bucket hydraulic cylinder 16, and the right travel hydraulic motor 34 or left travel hydraulic motor 35 in accordance with operating amounts of the operating levers 32L, 32R and a travel lever not illustrated. Further, output of the engine 17 may be transmitted to the hydraulic pump 18 or the generator motor 19 via a PTO (Power Take Off) shaft. Note that, pump pressure of the hydraulic oil discharged from the hydraulic pump 18 is detected by a pressure sensor 68, and received in other controllers C1. Note that other controllers C1 include controllers such as a pump controller C11, and the engine controller C12 other than the hybrid controller C2.

An electric driving system includes a first inverter 21 connected to the generator motor 19 via a power cable, a second inverter 22 connected to the first inverter 21 via a wiring harness, a transformer 26 provided as a transformer between the first inverter 21 and the second inverter 22 via the wiring harness, a capacitor 25 connected to the transformer 26 via a contactor 27 (electromagnetic contactor), the swing motor 23 connected to the second inverter 22 via a power cable, and so on. Note that the contactor 27 normally closes an electric circuit between the capacitor 25 and the transformer 26 to form an energized state. On the other hand, the hybrid controller C2 determines necessity to open the electric circuit in accordance with detection of electricity leakage and the like. When such determination is given, a command signal to change the energized state to a cut-off state is output to the contactor 27. Further, the contactor 27 having received the command signal from the hybrid controller C2 opens the electric circuit.

The swing motor 23 is mechanically connected to the swing machinery 24 as described above. At least one of power generated by the generator motor 19 and the power stored in the capacitor 25 becomes a power source of the swing motor 23, and swings the upper swing body 5 via the swing machinery 24. More specifically, the swing motor 23 accelerates swing of the upper swing body 5 by executing power running operation with the power supplied from at least one of the generator motor 19 and capacitor 25. Further, the swing motor 23 executes regenerative operation at the time of decelerating swing of the upper swing body 5, and supplies (charges) the power (regenerative energy) generated by the regenerative operation to the capacitor 25 or return shaft output to the engine 17 via the generator motor 19. Note that the swing motor 23 is provided with a rotation sensor 55 configured to detect the rotation speed of the swing motor 23 (swing motor rotation speed). The rotation sensor 55 is capable of measuring the rotation speed of the swing motor 23 at the time of power running operation (swing acceleration) or regenerative operation (swing deceleration). A signal indicating the rotation speed measured by the rotation sensor 55 is received in the hybrid controller C2. For the rotation sensor 55, a resolver can be used, for example.

The generator motor 19 supplies (charges) the generated power to the capacitor 25, and also supplies the power to the swing motor 23 depending on the situation. For the generator motor 19, SR (Switched Reluctance) motor is used, for example. Note that, in the case of using a synchronous motor using a permanent magnet instead of the SR motor, the synchronous motor can function to supply electric energy to the capacitor 25 or swing motor 23. In the case of using the SR motor for the generator motor 19, there is advantage in terms of cost because a magnet including an expensive rare metal is not used in the SR motor. The generator motor 19 has a rotor shaft mechanically connected to the drive shaft 20 of the engine 17. With this configuration, the rotor shaft of the generator motor 19 is rotated by drive of the engine 17, thereby the generator motor 19 generating the power. Further, a rotation sensor 54 is attached to the rotor shaft of the generator motor 19. The rotation sensor 54 measures a rotation speed of the generator motor 19 (generator motor speed), and a signal indicating a generator motor speed measured by the rotation sensor 54 is received in the hybrid controller C2. For the rotation sensor 54, a resolver can be used, for example.

The transformer 26 is disposed between the capacitor 25 and both the generator motor 19 and swing motor 23. The transformer 26 optionally boosts voltage of power (electric charge stored in the capacitor 25) supplied to the generator motor 19 or the swing motor 23 via the first inverter 21 and the second inverter 22. The voltage boosting will be described later. The boosted voltage is applied to the swing motor 23 at the time of causing the swing motor 23 to execute power running operation (swing acceleration), and is applied to the generator motor 19 at the time of assisting the output of the engine 17. Note that the transformer 26 has a function to drop (step down) the voltage to ½ at the time of charging the power generated by the generator motor 19 or the swing motor 23 to the capacitor 25. A transformer temperature sensor 50 configured to detect a temperature of the transformer 26 is attached to the transformer 26. A signal indicating the transformer temperature measured by the transformer temperature sensor 50 is received in the hybrid controller C2. Further, a voltage detection sensor 53 is attached to the wiring harnesses between the transformer 26 and both the first inverter 21 and second inverter 22 in order to measure a level of voltage boosted by the transformer 26 or a level of voltage of the power generated by regeneration of the swing motor 23. A signal indicating the voltage measured by the voltage detection sensor 53 is received in the hybrid controller C2.

According to the present embodiment, the transformer 26 has functions to boost or drop received DC power and output the same as the DC power. A type of the transformer 26 is not particularly limited as long as the above-described functions are provided. According to the present embodiment, for example, a transformer referred to as a transformer-coupled transformer in which the transformer and two inverters are combined with the transformer 26 is used. Besides the above, a DC-DC converter may also be adopted for the transformer 26. Next, the transformer-coupled transformer will be briefly described.

Figure 3:
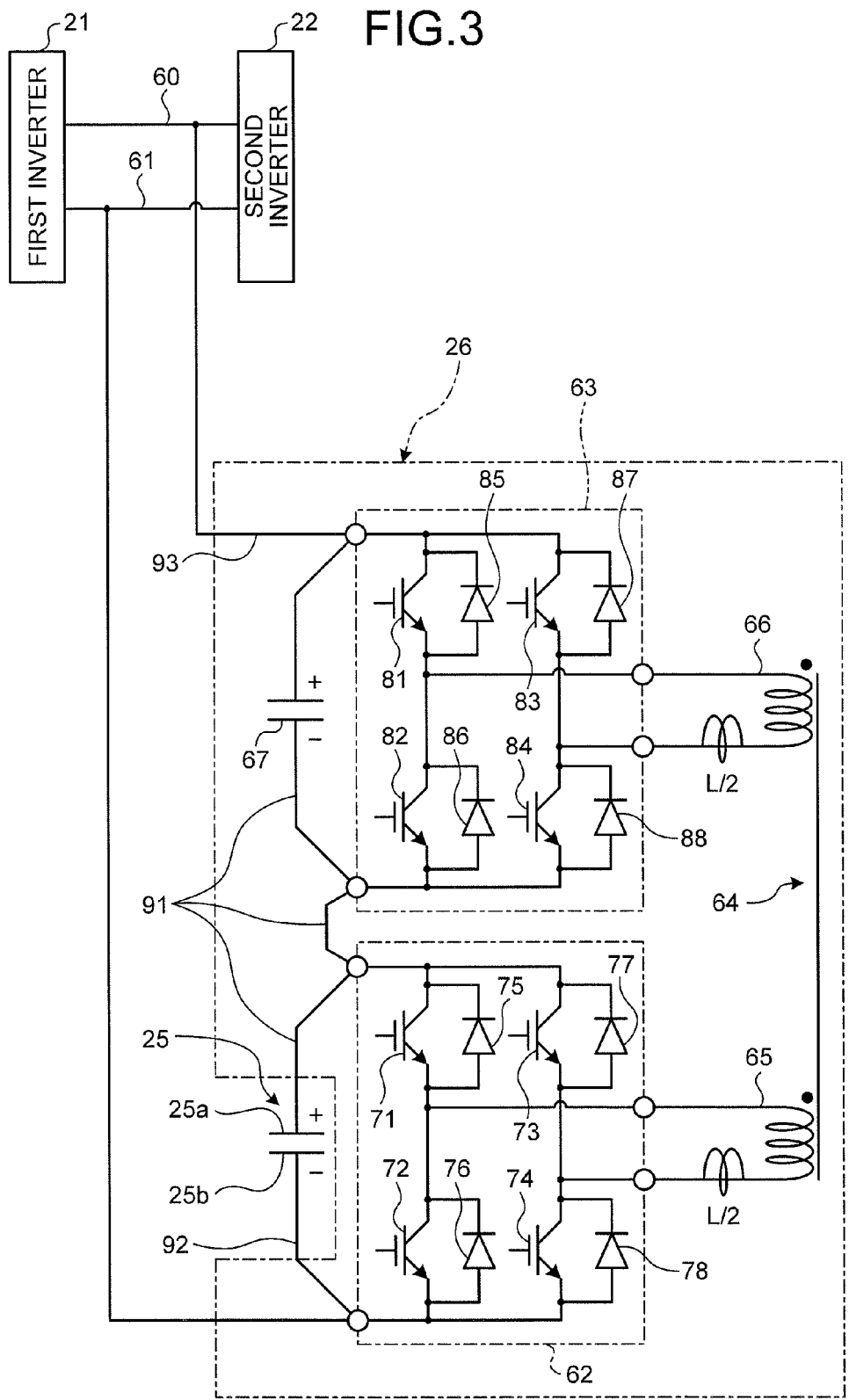
FIG. 3 is a circuit diagram illustrating a detailed configuration of a transformer.

FIG. 3 is a diagram illustrating the transformer-coupled transformer as the transformer. As illustrated in FIG. 3, the first inverter 21 and the second inverter 22 are connected via a positive electrode line 60 and a negative electrode line 61. The transformer 26 is connected between the positive electrode line 60 and the negative electrode line 61. The transformer 26 adopts AC (Alternating Current) link using a transformer 64 between the two inverters: a low-pressure side inverter 62, namely, a primary side inverter with a high-pressure side inverter 63, namely, a secondary inverter. Thus, the transformer 26 is the transformer-coupled transformer. In the following description, note that a winding ratio between a low-pressure side coil 65 and a high-pressure side coil 66 of the transformer 64 is set to one-to-one.

The low-pressure side inverter 62 and the high-pressure side inverter 63 are electrically connected in series such that a positive electrode of the low-pressure side inverter 62 and a negative electrode of the high-pressure side inverter 63 have additive polarity. In other words, the transformer 26 is connected in parallel so as to have the same polarity as the first inverter 21.

The low-pressure side inverter 62 includes: four IGBTs (Isolated Gate Bipolar Transistor) 71, 72, 73, 74 bridge-connected to the low-pressure side coil 65 of the transformer 64; and diodes 75, 76, 77, 78 connected in parallel to the IGBTs 71, 72, 73, 74 respectively and having polarities in opposite directions. The bridge connection referred here represents a configuration in which the low-pressure side coil 65 has an end connected to an emitter of the IGBT 71 and a collector of the IGBT 72, and the other end connected to an emitter of the IGBT 73 and a collector of the IGBT 74. The IGBTs 71, 72, 73, 74 are turned on by switching signals being applied to gates, and current flows from the collectors to the emitters.

A positive electrode terminal 25a of the capacitor 25 is electrically connected to the collector of the IGBT 71 via a positive electrode line 91. The emitter of the IGBT 71 is electrically connected to the collector of the IGBT 72. The emitter of the IGBT 72 is electrically connected to a negative electrode terminal 25b of the capacitor 25 via a negative electrode line 92. The negative electrode line 92 is connected to the negative electrode line 61.

In the same manner, the positive electrode terminal 25a of the capacitor 25 is electrically connected to the collector of the IGBT 73 via the positive electrode line 91. The emitter of the IGBT 73 is electrically connected to the collector of the IGBT 74. The emitter of the IGBT 74 is electrically connected to the negative electrode terminal 25b of the capacitor 25 via the negative electrode line 92.

The emitter of the IGBT 71 (anode of diode 75) and the collector of the IGBT 72 (cathode of diode 76) are connected to one terminal of the low-pressure side coil 65 of the transformer 64, and also the emitter of the IGBT 73 (anode of diode 77) and the collector of the IGBT 74 (cathode of diode 78) are connected to the other terminal of the low-pressure side coil 65 of the transformer 64.

The high-pressure side inverter 63 includes: four IGBTs 81, 82, 83, 84 bridge-connected to the high-pressure side coil 66 of the transformer 64; and diodes 85, 86, 87, 88 connected in parallel to the IGBTs 81, 82, 83, 84 respectively and having polarities in opposite directions. The bridge connection referred here represents a configuration in which the high-pressure side coil 66 has an end connected to an emitter of the IGBT 81 and a collector of the IGBT 82, and the other end connected to an emitter of the IGBT 83 and a collector of the IGBT 84. The IGBTs 81, 82, 83, 84 are turned on by switching signals being applied to gates, and current flows from the collectors to the emitters.

The collectors of IGBTs 81, 83 are electrically connected to the positive electrode line 60 of the first inverter 21 via a positive electrode line 93. The emitter of the IGBT 81 is electrically connected to the collector of the IGBT 82. The emitter of the IGBT 83 is electrically connected to the collector of the IGBT 84. The emitters of the IGBTs 82, 84 are electrically connected to the positive electrode line 91, namely, the collectors of the IGBTs 71, 73 of the low-pressure side inverter 62.

The emitter of the IGBT 81 (anode of diode 85) and the collector of the IGBT 82 (cathode of diode 86) are electrically connected to one terminal of the high-pressure side coil 66 of the transformer 64, and also the emitter of the IGBT 83 (collector of diode 87) and the collector of the IGBT 84 (cathode of diode 88) are electrically connected to the other terminal of the high-pressure side coil 66 of the transformer 64.

A capacitor 67 is electrically connected between the positive electrode line 93 connected to the collectors of the IGBTs 81, 83 and the positive electrode line 91 connected to the emitters of the IGBTs 82, 84. The capacitor 67 is used to absorb ripple current. The capacitor 67 used to absorb the ripple current may be connected to the collector side of the IGBT 71 and the emitter side of the IGBT 72.

The transformer 64 has a leakage inductance having a constant value L. The leakage inductance can be obtained by adjusting a gap between the low-pressure side coil 65 and the high-pressure side coil 66 of the transformer 64. In FIG. 3, the leakage inductance is divided such that the inductance value on the low-pressure side coil 65 becomes L/2 and that on the high-pressure side coil 66 becomes L/2.

The above-described transformer temperature sensor 50 is attached to each of the low-pressure side coil 65 and the high-pressure side coil 66 included in the transformer 64, and also attached to each of the IGBTs 71, 72, 73, 74 of the low-pressure side inverter 62 and each of the IGBTs 81, 82, 83, 84 of the high-pressure side inverter 63.

By selectively driving the IGBTs 71 to 74 and 81 to 84, the transformer 26 receives the power from the capacitor 25 input to the low-pressure side coil 65 as an input side. An output side after boosting is set to a state having an additive polarity formed by output from the low-pressure side coil 65 and output from the high-pressure side coil 66. Output from the output side after boosting is supplied to the first inverter 21 and second inverter 22 sides. In this manner, boosting is executed between the input and output sides. At this point, the number of coil turns on the low-pressure side is set as the number of coil turns on the input side, and the number of turns obtained by adding the number of coil turns on the low-pressure side with the number of coil turns on the high-pressure side is set as the number of coil turns on the output side, thereby acquiring a ratio of the number of turns between the number of turns on the input side and the number of turns on the output side. When the ratio of the number of turns becomes same as a boosting ratio, the loss at the time of transform becomes lowest.

Current control for the generator motor 19 and the swing motor 23 is executed by the first inverter 21 and the second inverter 22 respectively under control of the hybrid controller C2. An ammeter 52 is provided at the second inverter 22 in order to measure a level of direct current input to the second inverter 22. A value of the current flowing in the second inverter 22 may be also calculated based on a speed and a command torque value of the swing motor 23 and estimated conversion efficiency at the inverter without using the ammeter. A signal indicating the current detected by the ammeter 52 is received in the hybrid controller C2. An amount of power accumulated in the capacitor 25 (charge amount or electrical capacitance) can be controlled using the voltage level as an index. A voltage sensor 28 is provided at a predetermined output terminal of the capacitor 25 in order to detect the level of the voltage of the power accumulated in the capacitor 25. A signal indicating the voltage of the capacitor detected by the voltage sensor 28 is received in the hybrid controller C2. The hybrid controller C2 monitors the charge amount (power amount (charge amount or electrical capacitance)) of the capacitor 25, and performs energy management, such as supplying (charging) the power generated by the generator motor 19 to the capacitor 25 or supplying to the swing motor 23 (power supply for power running action).

According to the present embodiment, an electric double-layered capacitor is used for the capacitor 25, for example. Instead of the capacitor 25, a storage battery configured to function as another secondary battery, such as a lithium-ion cell and nickel-hydrogen cell, may also be used. Further, a permanent magnet synchronous motor is used for the swing motor 23, for example, but not limited thereto. A capacitor temperature sensor 51 configured to detect a temperature of the capacitor 25 as the storage battery is attached to the capacitor 25. A signal indicating the capacitor temperature measured by the capacitor temperature sensor 51 is received in the hybrid controller C2.

The hydraulic driving system and the electric driving system are driven in response to operation of the operating levers 32L, 32R such as a work unit lever and a swing lever provided inside the operating room 6 disposed at the vehicle body 2. Vertical movement of the boom and excavation/dump operation of the bucket are executed in response to operation of the operating lever 32R in the front, rear, right, and left directions, and lateral swing operation and the excavation/dump operation of the arm are executed in response to operation of the operating lever 32L in the front, rear, right, and left directions. The right and left travel levers not illustrated are provided in addition to the above-described levers. In the case where an operator of the hybrid excavator 1 operates the operating lever 32L (swing lever) as an operating unit to swing the upper swing body 5, an operating direction and an operating amount of the swing lever are detected by a potentiometer, a pilot pressure sensor, or the like, and the detected operating amount is transmitted to other controllers C1 and also to the hybrid controller C2 as an electric signal.

In the case where the other operating lever is operated, an electric signal is also transmitted to other controllers C1 and the hybrid controller C2 in the same manner. The other controllers C1 and the hybrid controller C2 control the second inverter 22, the transformer 26, and the first inverter 21 in accordance with the operating direction and the operating amount of the swing lever or the operating direction and the operating amount of the other operating lever in order to execute power transfer control (energy management) such as rotary operation of the swing motor 23 (power running action and regenerative action), electric energy management for the capacitor 25 (control for charge or discharge), and electric energy management for the generator motor 19 (assist for power generation or engine output, and power running action to the swing motor 23).

A monitoring device 30 and a key switch 31 are provided inside the operating room 6 in addition to the operating levers 32L, 32R. The monitoring device 30 is formed of a liquid crystal panel, an operating button, and so on. Further, the monitoring device 30 may be a touch panel in which a display function of the liquid crystal panel and a function of inputting various kinds of information with the operating button are integrated. The monitoring device 30 is an information input/output device having a function to notify an operator or a service man of information indicating operational states of the hybrid excavator 1 (state of engine water temperature, state of occurrence of failure in hydraulic devices, etc., or state of residual fuel amount, and so on), and further a function for an operator to execute desired setting or command issuance (setting for engine output level, setting for speed level of travel speed, etc. or command for capacitor charge releasing described later) with respect to the hybrid excavator 1.

A throttle dial 56 is a switch to set a fuel supply amount to the engine 17, and a setting value of the throttle dial 56 is converted to an electric signal and output to other controllers C1.

The key switch 31 includes a key cylinder as a main component. The key switch 31 is configured to start a starter (engine start motor) attached to the engine 17, and drive the engine (engine start) by inserting a key into the key cylinder and turning the key. Further, the key switch 31 is configured to issue a command to stop the engine (engine stop) by turning the key in an opposite direction of the engine start while driving the engine. In other words, the key switch 31 is a command output unit configured to output the command to the engine 17 and various kinds of electric devices of the hybrid excavator 1.

When the key is turned to stop the engine 17 (more specifically, turned to an OFF position described later), fuel supply to the engine 17 and power supply (energization) to the various kinds of electric devices from a battery not illustrated are cut off, thereby stopping the engine. When the key is turned to the OFF position, the key switch 31 cuts off energization to the various kinds of electric devices from the battery not illustrated, and when the key is turned to an ON position, the key switch energizes the various kinds of electric devices from the battery not illustrated. Further, when the key is turned from the ON position to a START (ST) position, the engine can be started by starting the starter not illustrated. After the engine 17 is started, the key is kept turned to the ON position while the engine 17 is driven.

Note that a different command output unit such as a push button type key switch may be adopted instead of the key switch 31 in which the above-described key cylinder is the main component. More specifically, a button may have functions to change a state to ON when the button is pushed once while the engine 17 is stopped, and change the state to START (ST) when the button is pushed again, and further change the state to OFF when the button is pushed while the engine 17 is driven. Further, on the condition that the button is pushed for a predetermined time while the engine 17 is stopped, the state is changed from OFF to START (ST) such that the engine 17 can be started.

The other controllers C1 control the engine 17 and the hydraulic pump 18 based on a command signal output from the monitoring device 30, a command signal output in response to the key position of the key switch 31, and a command signal output in response to operation of the operating levers 32L, 32R (signal indicating the above-described operating amount and operating direction). The engine 17 is mainly controlled by the engine controller C12 inside the other controllers C1. Further, the hydraulic pump 18 is mainly controlled by the pump controller C11 inside the other controllers C1. The engine 17 is an engine capable of executing electrical control with a common-rail fuel injector 40. The engine 17 can obtain target engine output by appropriately controlling a fuel injection amount with the other controllers C1, and driving can be executed by setting an engine speed and torque that can be output in accordance with a load state of the hybrid excavator 1.

The hybrid controller C2 controls the power transfer with the generator motor 19, the swing motor 23, and the capacitor 25 by controlling the first inverter 21, the second inverter 22, and the transformer 26 under coordination control with the other controllers C1 as described above. Further, the hybrid controller C2 obtains detection values by various kinds of sensors such as the voltage sensor 28, the transformer temperature sensor 50, and the capacitor temperature sensor 51, and controls the work machine according to the present embodiment based on the detection values.

The hybrid controller C2 includes a generation control unit C21 and an assist control unit C22. The generation control unit C21 controls power generation by the generator motor 19. Further, the assist control unit C22 executes engine assist control by the generator motor 19.

(Assist Control)

Figure 4:
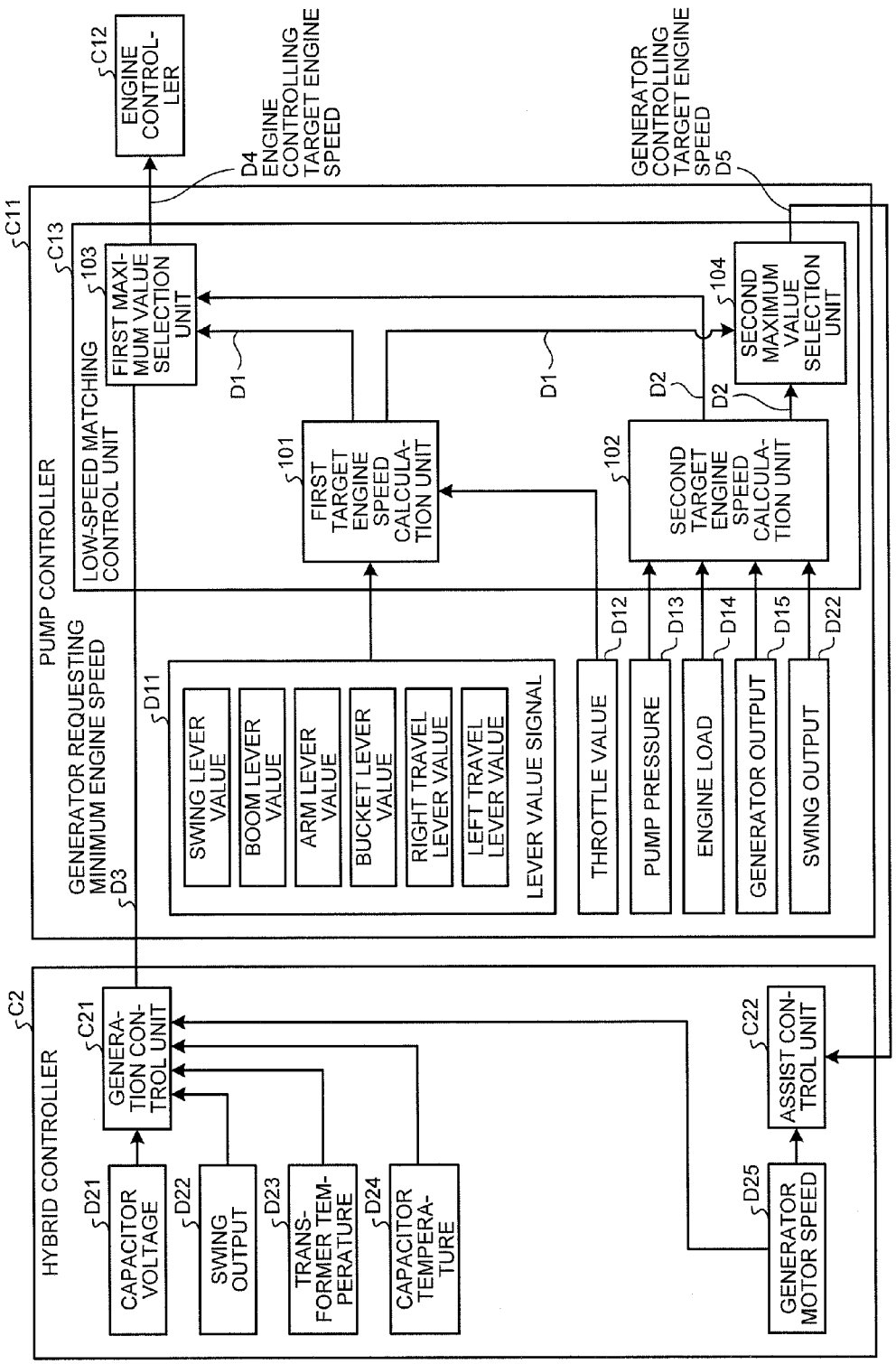
FIG. 4 is a block diagram illustrating configurations of a hybrid controller, a pump controller, and an engine controller related to engine assist control.

Here, engine assist control by the generator motor 19 will be mainly described referring to FIG. 4. In FIG. 4, a low-speed matching control unit C13 is included in the pump controller C11 inside the other controllers C1. In the low-speed matching control unit C13, a first target engine speed calculation unit 101 calculates a first target engine speed D1 based on a lever value signal D11 which is a sum of an operational swing lever value, a boom lever value, an arm lever value, a bucket lever value, a right travel lever value, a left travel lever value by the operating levers 32L, 32R; and a throttle value D12 by the throttle dial 56. The first target engine speed D1 corresponds to intention of the operator. Further, a second target engine speed calculation unit 102 calculates a second target engine speed D2 based on pump pressure D13, an engine load D14, generator output D15, and swing output D22. The second target engine speed D2 is determined in accordance with the output of the engine 17 and the generator motor 19, a load of the hydraulic pump 18, and the swing output. Note that the engine load D14 is calculated and output based on the engine speed and engine torque estimated from the fuel injection amount, engine speed, atmospheric temperature, etc. Here, the engine torque is actually measured by a torque sensor. Further, the first target engine speed calculation unit 101 and the second target engine speed calculation unit 102 may be integrated as one target engine speed calculation unit. A load of the hydraulic pump 18 is estimated from the pump pressure or, if necessary, the torque is acquired by multiplying the pump pressure by a swash plate angle of a variable displacement pump.

Meanwhile, in the case where the first target engine speed calculation unit 101 and the second target engine speed calculation unit 102 are integrated as one target engine speed calculation unit, only the second target engine speed calculation unit 102 may be provided and the second target engine speed calculation unit 102 may be configured to calculate and output the second target engine speed D2 only based on the engine load D14 which is at least an internal load, and the generator output D15. Also, in this case, preferably the second target engine speed calculation unit 102 further calculates and outputs the second target engine speed D2 based on the pump pressure D13 which is an external load, and the swing output D22. Further, as illustrated in FIG. 4, the first target engine speed calculation unit 101 is provided, and preferably the first target engine speed calculation unit 101 calculates and outputs the first target engine speed D1 based on the lever value signal D11 corresponding to the operator's intention, and the throttle value D12.

A first maximum value selection unit 103 selects, as an engine controlling target engine speed D4, a maximum engine speed from among the first target engine speed D1, the second target engine speed D2, and a generator requesting minimum engine speed D3 output from the generation control unit C21, and outputs the engine controlling target engine speed D4 to the engine controller C12. The engine controller C12 controls the fuel injection amount so as to achieve the received engine controlling target engine speed D4.

On the other hand, a second maximum value selection unit 104 outputs, as a generator controlling target engine speed D5, a maximum engine speed out of the first target engine speed D1 and the second target engine speed D2, to the assist control unit C22 of the hybrid controller C2. In the case where a deviation between a generator motor speed D25 measured by the rotation sensor 54 and the generator controlling target engine speed D5 received from the pump controller C11 is a predetermined value Δω or more, the assist control unit C22 executes control to perform engine assist.

The generation control unit C21 acquires the generator requesting minimum engine speed D3, which is a minimum engine speed to secure generation power of the capacitor 25, based on: capacitor voltage D21 detected by the voltage sensor 28; the swing output D22 obtained from current detected by the ammeter 52 and voltage detected by the voltage detection sensor 53; a transformer temperature D23 detected by the transformer temperature sensor 50; a capacitor temperature D24 detected by the capacitor temperature sensor 51; and the generator motor speed D25, and outputs the generator requesting minimum engine speed D3 to the first maximum value selection unit 103.

According to the related arts, the engine controlling target engine speed D4 output from the first maximum value selection unit 103 is output to the assist control unit C22 as the generator controlling target engine speed. Therefore, in the case the capacitor voltage of the capacitor 25 is decreased, the generator controlling target engine speed is output high in order to secure necessary generation power. Then, the assist control unit C22 executes engine assist to cause the generator motor 19 to act as a motor based on the fact that the deviation between the generator motor speed D25 and the generator controlling target engine speed becomes the predetermined value $\Delta\omega$ or more. However, the capacitor voltage is further decreased by this engine assist. This further decrease of the capacitor voltage increases input/output current with respect to the transformer 26, and also increases the transform loss because a voltage value deviates from an optimal voltage converting setting value preliminarily set for the transformer 26. Consequently, heat balance of the transformer 26 is deteriorated. Further, the decrease of the capacitor voltage decreases charging/discharging efficiency of the capacitor at the time of charging/discharging, thereby causing deterioration of heat balance caused by the charging loss.

In contrast, according to the present embodiment, control is executed by considering the generator requesting minimum engine speed D3 for the engine controlling target engine speed D4, and by not considering the generator requesting minimum engine speed D3 for the generator controlling target engine speed D5. As a result, in the case where the capacitor voltage of the capacitor 25 is decreased, the generator controlling target engine speed D5 does not become high even though the generator requesting minimum engine speed D3 is output high in order to secure the necessary generation power. Therefore, the assist control unit C22 does not execute engine assist because the deviation between the generator motor speed D25 and the generator controlling target engine speed does not reach the predetermined value $\Delta\omega$ or more. As a result, engine assist control can be executed while suppressing deterioration of the heat balance of the transformer 26. In other words, useless engine assist control which may deteriorate the heat balance of the transformer 26 is not executed.

Figure 5:
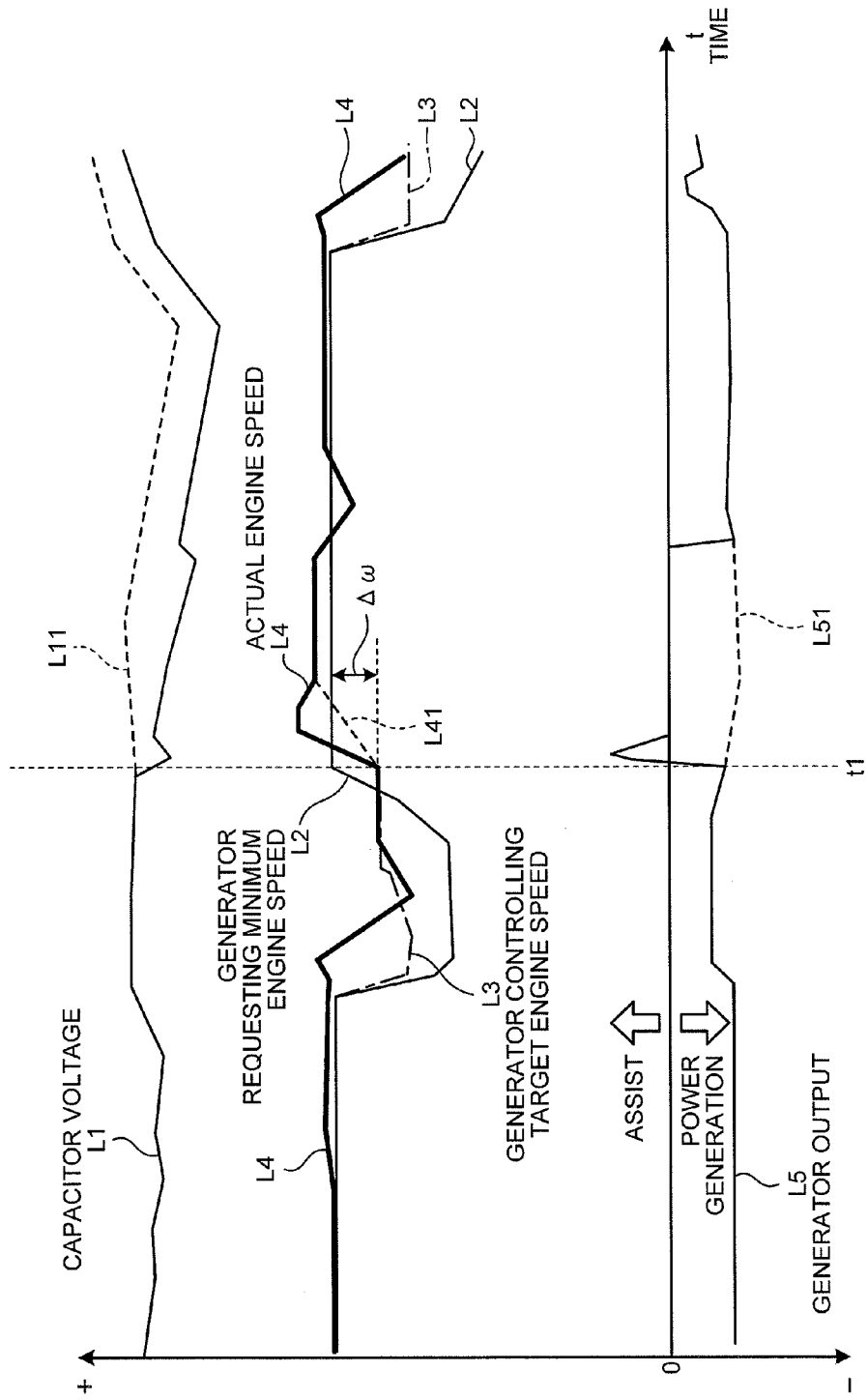
FIG. 5 is a time chart illustrating an exemplary engine assist control.

FIG. 5 is a time chart illustrating a specific assist control. In FIG. 5, curves L1 to L5 respectively indicate changes of the capacitor voltage D21, generator requesting minimum engine speed D3, generator controlling target engine speed D5, actual engine speed, and generator output D15. Further, a curve illustrated by a dotted line L11 indicates changes of the capacitor voltage D21 according to the present embodiment. Additionally, a curve illustrated by a dotted line L41 indicates changes of the actual engine speed according to the present embodiment. Moreover, a curve L51 indicates changes of the generator output D15. Meanwhile, when the generator output D15 is negative, the generator motor 19 executes generation action, and when the generator output D15 is positive, the generator motor 19 executes engine assist action.

In FIG. 5, according to the related arts, the generator requesting minimum engine speed L2 becomes higher than the generator controlling target engine speed L3 at time point t1, and engine assist is executed immediately after the time point t1 at which the generator controlling target engine speed L3 becomes higher than the actual engine speed L4 (generator motor speed D25) by the predetermined value $\Delta\omega$ or more. Consequently, the generator output D15 becomes positive and the actual engine speed L4 is raised. The capacitor voltage L1 is decreased by this engine assist. According to the control of the related arts, in the generator controlling target engine speed D5 in FIG. 4, the generator requesting minimum engine speed D3 which has become higher than the first target engine speed D1 and the second target engine speed D2 is included. Thus, the engine assist is executed.

In contrast, according to the present embodiment, the generator requesting minimum engine speed D3 that has become higher than the first target engine speed D1 and the second target engine speed D2 is not included in the generator controlling target engine speed D5 in FIG. 4. Therefore, the generator requesting minimum engine speed L2 in FIG. 5 does not become higher than the actual engine speed L4 (generator motor speed D25) by the predetermined value $\Delta\omega$ or more, and the engine assist is not executed even immediately after the time point t1 (refer to the curve L51). Therefore, the actual engine speed L4 does not also become rapidly high (refer to the curve L41) and further the capacitor voltage L1 is not decreased as well (refer to the curve L11).

As a result, according to the present embodiment, useless engine assist control which may deteriorate heat balance of the transformer 26 and the capacitor 25 is not executed even though the generator requesting minimum engine speed D3 becomes high.

(Modified Example of Assist Control)

According to the above-described assist control, the generator requesting minimum engine speed D3 is not constantly used at the time of outputting the generator controlling target engine speed D5 received in the assist control unit C22. However, according to the modified example, the generator controlling target engine speed D5 not using the generator requesting minimum engine speed D3 is output in the case of satisfying any one of following inhibiting conditions: the capacitor voltage D21 exceeds predetermined voltage D21$th$; the transformer temperature D23 exceeds a predetermined transformer temperature D23$th$; the capacitor temperature D24 exceeds a predetermined capacitor temperature D24$th$; the generator requesting minimum engine speed D3 is higher than the maximum engine speed out of the first target engine speed D1 and the second target engine speed.

Figure 6:
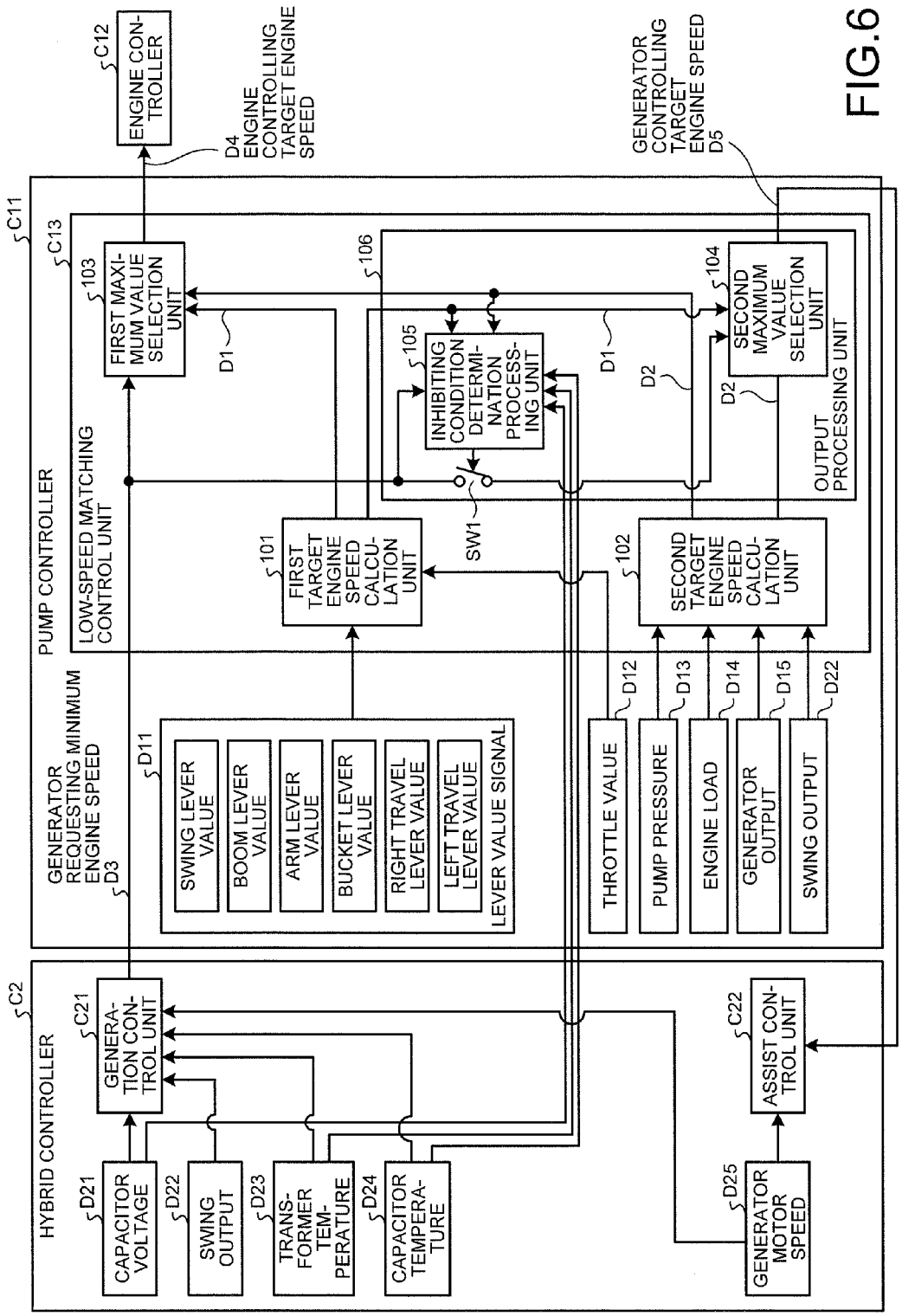
FIG. 6 is a block diagram illustrating configurations of the hybrid controller, pump controller, and engine controller related to a modified example of engine assist control.

More specifically, as illustrated in FIG. 6, the generator requesting minimum engine speed D3 can be received in the second maximum value selection unit 104 via a switch SW1, and in the case where the generator requesting minimum engine speed D3 is received in the second maximum value selection unit 104 via the switch SW1, the second maximum value selection unit 104 outputs, as the generator controlling target engine speed D5, the maximum engine speed out of the generator requesting minimum engine speed D3, the first target engine speed D1, and the second target engine speed D2, to the assist control unit C22. On the other hand, in the case where the switch SW1 is OFF and the generator requesting minimum engine speed D3 is not received in the second maximum value selection unit 104, the second maximum value selection unit 104 outputs, as the generator controlling target engine speed D5, the maximum engine speed out of the first target engine speed D1 and the second target engine speed D2, to the assist control unit C22. Additionally, an output processing unit 106 includes the switch SW1, an inhibiting condition determination processing unit 105, and the second maximum value selection unit 104.

Figure 7:
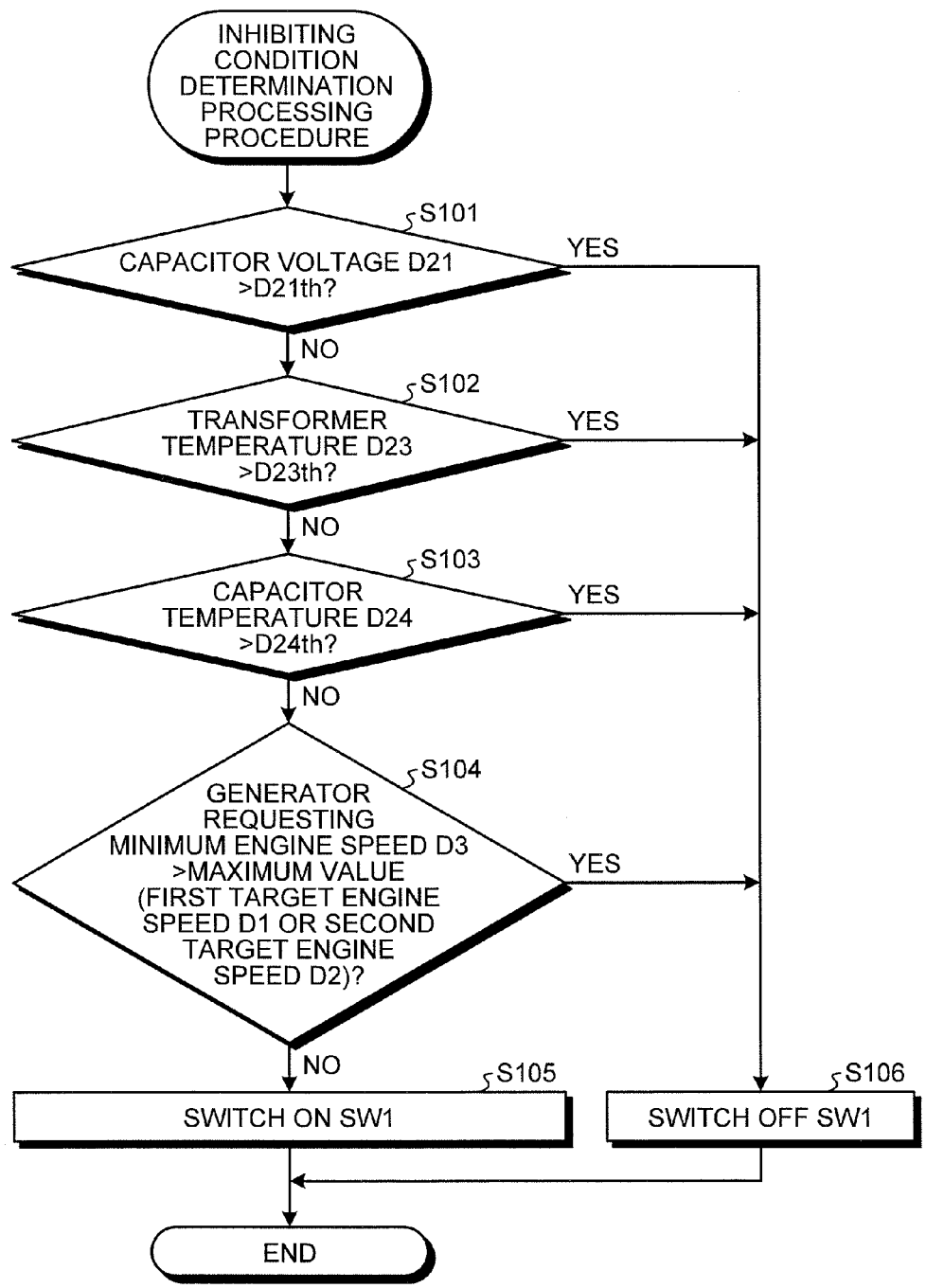
FIG. 7 is a flowchart illustrating an inhibiting condition determination processing procedure by an inhibiting condition determination processing unit.

The switch SW1 is turned ON/OFF under the control of an inhibiting condition determination processing unit 105. Here, an inhibiting condition determination processing procedure by the inhibiting condition determination processing unit 105 will be described based on a flowchart illustrated in FIG. 7. Note that the processing is executed in every predetermined sampling time.

First, the inhibiting condition determination processing unit 105 determines whether the capacitor voltage D21 exceeds the predetermined voltage D21$th$ (Step S101). In the case where the capacitor voltage D21 exceeds the predetermined voltage D21*th* (Step S101, Yes), the switch SW1 is turned OFF, and the processing ends (Step S106).

Further, in the case where the capacitor voltage D21 does not exceed the predetermined voltage D21*th* (Step S101, No), whether the transformer temperature D23 exceeds the predetermined transformer temperature D23*th* is further determined (Step S102). In the case where the transformer temperature D23 exceeds the predetermined transformer temperature D23*th* (Step S102, Yes), the switch SW1 is turned OFF, and the processing ends (Step S106).

In the case where the transformer temperature D23 does not exceed the predetermined transformer temperature D23*th* (Step S102, No), whether capacitor temperature D24 exceeds the predetermined capacitor temperature D24*th* is further determined (Step S103). In the case where the capacitor temperature D24 exceeds the predetermined capacitor temperature D24*th* (Step S103, Yes), the switch SW1 is turned OFF, and the processing ends (Step S106).

Further, in the case where the capacitor temperature D24 does not exceed the predetermined capacitor temperature D24*th* (Step S103, No), whether the generator requesting minimum engine speed D3 exceeds a higher engine speed out of the first target engine speed D1 and the second target engine speed is further determined (Step S104). In the case where the generator requesting minimum engine speed D3 exceeds the higher engine speed out of the first target engine speed D1 and the second target engine speed (Step S104, Yes), the switch SW1 is turned OFF, and the processing ends (Step S106). On the other hand, in the case where the generator requesting minimum engine speed D3 does not exceed the higher engine speed out of the first target engine speed D1 and the second target engine speed (Step S104, No), the switch SW1 is turned ON, and the processing ends (Step S105).

Meanwhile, the inhibiting condition determination processing unit 105 may be configured to output the generator controlling target engine speed D5 not using generator requesting minimum engine speed D3 in the case of satisfying all of the following inhibiting conditions: the capacitor voltage D21 exceeds the predetermined voltage D21*th*; the transformer temperature D23 exceeds the predetermined transformer temperature D23*th*; the capacitor temperature D24 exceeds the predetermined capacitor temperature D24*th*; and the generator requesting minimum engine speed D3 is higher than the maximum engine speed out of the first target engine speed D1 and the second target engine speed.

(Low-Speed Matching Control)

Figure 8:
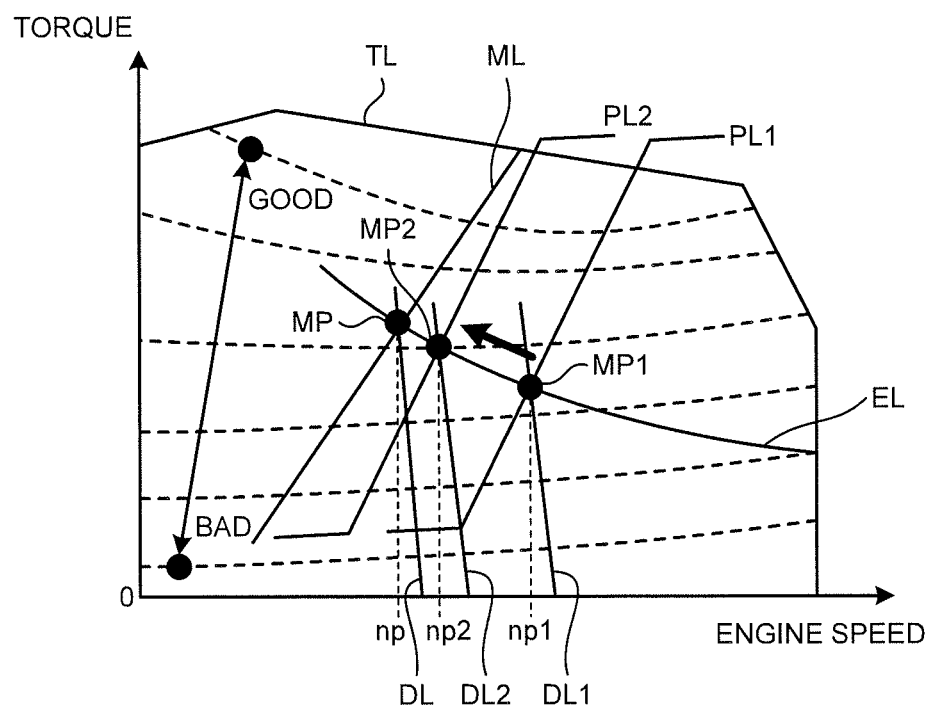
FIG. 8 is a torque chart relative to an engine speed illustrating an outline of low-speed matching control.

By the way, according to the engine control for the excavator, there may be a case where control is executed so as to follow a droop curve DL1 illustrated in an engine torque chart relative to the engine speed illustrated in FIG. 8. The droop curve DL1 passes an intersection point between an equal horsepower curve EL that sets target engine output and a pump absorption torque line PL1 that sets engine output relative to a load of the hydraulic pump 18. Note that a curve TL indicates a maximum torque curve of the engine 17.

In contrast, in the low-speed matching control unit C13 disposed inside the pump controller C11, a matching route ML that preliminarily sets a target matching point passing an area having good fuel efficiency when the engine speed becomes high due to increase of the engine output is specified. Note that the matching route ML is set considering the load of the hydraulic pump 18, loads of auxiliary machines, and output of the generator motor 19. Meanwhile, the pump absorption torque line in the case of considering only the load of the hydraulic pump 18 is set as PL1 and PL2 so as to be shifted to a higher rotation side. The low-speed matching control unit C13 calculates a target engine speed np and the target engine output for engine control based on the operating amounts of the levers, engine load, load of the hydraulic pump, and the output states of the generator motor and the swing motor, thereby acquiring a target matching point MP on the matching route ML. The low-speed matching control unit C13 may be disposed inside the hybrid controller C2.

Further, the low-speed matching control unit C13 shifts the pump absorption torque line PL1 to the pump absorption torque line PL2 in accordance with, for example, the load state of the hydraulic pump 18, more specifically, when the load state is decreased. Then, the engine speed is raised along the equal horsepower curve EL in which the engine output is kept constant relative to increase of the engine speed. In this manner, the pump absorption torque line PL2 and the equal horsepower curve EL are matched at the intersection point MP2, thereby achieving an engine speed np2 lower than an engine speed np1. More specifically, the target engine speed np in the target matching point MP, namely, the intersection with the equal horsepower curve EL, is shifted to a lower engine speed side. Note that the target engine output can be acquired from an intersection point between the droop curve DL1 and the pump absorption torque line PL1 besides the equal horsepower curve (target engine output setting line) EL.

Here, a dotted line illustrated in FIG. 8 indicates an equal fuel consumption curve in which the higher the torque is, the better the fuel consumption is, and the lower the torque is, the more deteriorated fuel consumption is. Further, in the equal horsepower curve (target engine output setting line) EL that passes across the equal fuel consumption curve, the lower the engine speed is, the better the fuel consumption is. In other words, the lower the engine speed is, the better the fuel consumption is in the case of equal horsepower. More specifically, according to the above-described low-speed matching control, the fuel consumption becomes better when the matching route ML is set on the lower engine speed side because the target engine speed np is set low in the equal horsepower.

Meanwhile, in the case of executing the above-described low-speed matching control, a power generation amount of the generator motor 19 is reduced because the target engine speed becomes low relative to the engine rotation control using the droop curve. As a result, the voltage decrease of the capacitor voltage D21 tends to occur. According to the assist control in the related art, useless engine assist caused by such decrease of the capacitor voltage D21 is executed as described above, and heat balance is deteriorated.

However, according to the present embodiment, useless engine assist is not executed and deterioration of heat balance can be suppressed even in the case of executing such low-speed matching control.

REFERENCE SIGNS LIST

1 Hybrid excavator
2 Vehicle body
3 Work unit
4 Lower traveling body
4*a* Travel device
4*b* Crawler
5 Upper swing body
6 Operating room
7 Fuel tank
8 Hydraulic oil tank 9 Engine room
10 Counterweight
11 Boom
12 Arm
13 Bucket
14 Boom hydraulic cylinder
15 Arm hydraulic cylinder
16 Bucket hydraulic cylinder
17 Engine
18a Swash plate
18 Hydraulic pump
19 Generator motor
20 Drive shaft
21 First inverter
22 Second inverter
23 Swing motor
24 Swing machinery
25 Capacitor
26 Transformer
27 Contactor
28 Voltage sensor
30 Monitoring device
31 Key switch
32L,32R Operating lever
33 Operation valve
34 Right travel hydraulic motor
35 Left travel hydraulic motor
40 Fuel injector
41 Rotation sensor
50 Transformer temperature sensor
51 Capacitor temperature sensor
52 Ammeter
53 Voltage detection sensor
54, 55 Rotation sensor
56 Throttle dial
68 Pressure sensor
101, 102 Target engine speed calculation unit
103 Maximum value selection unit
104 Maximum value selection unit
105 Inhibiting condition determination processing unit
106 Output processing unit
C1 Other controllers
C11 Pump controller
C12 Engine controller
C13 Low-speed matching control unit
C2 Hybrid controller
C21 Generation control unit
C22 Assist control unit
D1, D2 Target engine speed
D3 Generator requesting minimum engine speed
D4 Engine controlling target engine speed
D5 Generator controlling target engine speed
D11 Lever value signal
D12 Throttle value
D13 Pump pressure
D14 Engine load
D15 Generator output
D21 Capacitor voltage
D22 Swing output
D23 Transformer temperature
D24 Capacitor temperature
D25 Generator motor speed
SW1 Switch

The invention claimed is:

1. A hybrid work machine, comprising:
an engine;
a generator motor connected to a drive shaft of the engine;
a storage battery configured to store power generated by the generator motor and supply power to the generator motor;
a motor configured to be driven by at least one of power generated by the generator motor and power stored in the storage battery;
a transformer disposed between the storage battery and both the generator motor and the motor;
a pump controller configured to calculate a target engine speed based on at least an engine load and an output state of the generator motor, to calculate and output an engine controlling target engine speed based on the target engine speed and a generator requesting minimum engine speed, and to set a generator controlling target engine speed to a value equal to the target engine speed and output the generator controlling target engine speed;
a hybrid controller configured to output the generator requesting minimum engine speed, which is a minimum engine speed to secure generation power of the storage battery, in accordance with a storage state of the storage battery and a generator motor speed, the hybrid controller further configured to control engine assist based on the generator controlling target engine speed and the generator motor speed; and
an engine controller configured to control an engine speed based on the engine controlling target engine speed.

2. A hybrid work machine, comprising:
an engine;
a generator motor connected to a drive shaft of the engine;
a storage battery configured to store power generated by the generator motor and supply power to the generator motor;
a motor configured to be driven by at least one of power generated by the generator motor and power stored in the storage battery;
a transformer disposed between the storage battery and both the generator motor and the motor;
a pump controller configured to calculate a target engine speed based on at least an engine load and an output state of the generator motor, and to calculate and output an engine controlling target engine speed based on the target engine speed and the generator requesting minimum engine speed, the pump controller including an output processing unit which is configured to output a generator controlling target engine speed;
a hybrid controller configured to output a generator requesting minimum engine speed, which is a minimum engine speed to secure generation power of the storage battery, in accordance with a storage state of the storage battery and a generator motor speed, the hybrid controller further configured to control engine assist based on the generator controlling target engine speed, and a generator motor speed; and
an engine controller configured to control an engine speed based on the engine controlling target engine speed,
wherein the output processing unit is configured to output the target engine speed as the generator controlling target engine speed at a time the generator requesting minimum engine speed exceeds the target engine speed; voltage of the storage battery exceeds predetermined voltage; a transformer temperature exceeds a predetermined transformer temperature; and a storage battery temperature exceeds a predetermined storage battery temperature, and
to output a higher engine speed out of the generator requesting minimum engine speed and the target engine speed as the generator controlling target engine speed at a time: the voltage of the storage battery does not exceed the predetermined voltage; the transformer temperature does not exceed the predetermined transformer temperature; or the storage battery temperature does not exceed the predetermined storage battery temperature.

3. The hybrid work machine according to claim 2, wherein
the pump controller calculates, as a target engine speed, an engine speed at an intersection point between a matching route and a target engine output setting line that specifies target engine output in a torque chart relative to an engine speed, the matching route preliminarily setting a target matching point passing an area on the torque chart having good fuel efficiency when the engine speed becomes high due to increase of engine output.

4. The hybrid work machine according to claim 2, wherein
a voltage conversion ratio of the transformer is same as a ratio of number of turns between number of coil turns on a side to be an input side and number of coil turns on a side to be an output side.

5. The hybrid work machine according to claim 1, wherein
the pump controller calculates, as a target engine speed, an engine speed at an intersection point between a matching route and a target engine output setting line that specifies target engine output in a torque chart relative to an engine speed, the matching route preliminarily setting a target matching point passing an area on the torque chart having good fuel efficiency when the engine speed becomes high due to increase of engine output.

6. The hybrid work machine according to claim 1, wherein
a voltage conversion ratio of the transformer is same as a ratio of number of turns between number of coil turns on a side to be an input side and number of coil turns on a side to be an output side.

7. The hybrid work machine according to claim 3, wherein
a voltage conversion ratio of the transformer is same as a ratio of number of turns between number of coil turns on a side to be an input side and number of coil turns on a side to be an output side.

8. The hybrid work machine according to claim 5, wherein
a voltage conversion ratio of the transformer is same as a ratio of number of turns between number of coil turns on a side to be an input side and number of coil turns on a side to be an output side.

* * * * *